United States Patent
Bucey et al.

(10) Patent No.: US 6,668,446 B2
(45) Date of Patent: Dec. 30, 2003

(54) RECUPERATOR DUCT ASSEMBLY LINE

(75) Inventors: Charles W. Bucey, San Diego, CA (US); Steven W. Clayton, Metamora, IL (US); Douglas R. Ervin, Metamora, IL (US); Robert M. Jones, Metamora, IL (US); Chad Miars, Peoria, IL (US)

(73) Assignee: Solar Turbines Inc, San Diego, CA (US)

( * ) Notice: Subject to any disclaimer, the term of this patent is extended or adjusted under 35 U.S.C. 154(b) by 108 days.

(21) Appl. No.: 10/001,510

(22) Filed: Oct. 31, 2001

(65) Prior Publication Data

US 2003/0079345 A1 May 1, 2003

(51) Int. Cl.[7] .................................................. B23P 15/26
(52) U.S. Cl. ........................... 29/726; 29/33 G; 29/712; 29/720; 29/890.034
(58) Field of Search ................................. 29/726, 33 G, 29/33 P, 709, 711, 712, 720, 890.034; 165/165, 166, 125; 60/39.511

(56) References Cited

U.S. PATENT DOCUMENTS

| | | | | |
|---|---|---|---|---|
| 5,060,721 A | | 10/1991 | Darragh | |
| 5,081,834 A | * | 1/1992 | Darragh | 60/39.511 |
| 5,918,368 A | * | 7/1999 | Ervin et al. | 29/890.03 |
| 6,112,403 A | * | 9/2000 | Ervin et al. | 29/726 |
| 6,158,121 A | * | 12/2000 | Ervin et al. | 29/890.034 |
| 6,308,409 B1 | * | 10/2001 | Bucey et al. | 29/890.034 |
| 6,357,113 B1 | * | 3/2002 | Williams | 29/890.034 |
| 2002/0133949 A1 | * | 9/2002 | Bucey et al. | 29/890.034 |

* cited by examiner

*Primary Examiner*—I Cuda-Rosenbaum
(74) *Attorney, Agent, or Firm*—Larry G Cain

(57) ABSTRACT

An assembly line for economically and efficiently assembling a core into a recuperator. The assembly line has an inlet end, an assembly station, a welding station, a control station and an outlet end. The inlet end has a plurality of the cores to be used for assembly thereat. The core is positioned within the assembly station and an assembly fixture locates a ducting structure in a preestablished relationship to the core. The control station using a plurality of sensors sends an input to a controller and the welding station performs a weld fixedly securing the ducting structure to the core.

14 Claims, 4 Drawing Sheets

RECUPERATOR DUCT ASSEMBLY LINE

TECHNICAL FIELD

This invention relates generally to a heat exchanger or more explicitly to a recuperator and more particularly to an apparatus and method for assembling the recuperator.

BACKGROUND

Many application use the recuperator which is a specific type of heat exchanger to extract heat from a fluid. One such application is that of a gas turbine engine. For example, to increase the operation efficiency of the gas turbine engine, heat is extracted from the exhaust gas and used to preheat the intake air. Typically, the recuperator for a gas turbine engine must be capable of operating at temperatures of between about 500 degrees C. and 700 degrees C. and internal pressures of between approximately 450 kPa and 1400 kPa under operating conditions involving repeated starting and stopping cycles.

Many recuperators are of a primary surface construction. In a primary surface recuperator, a plurality of thin sheets are stacked in a spaced apart configuration to form a cell. The cells are assembled, such as by welding, to form a core. The spacing within the core forms a plurality of donor passages and a plurality of recipient passages. In applying the recuperator to the gas turbine engine, the hot exhaust gas is passed through the donor passages and an atmospheric temperature intake air is passed through the recipient passages. Heat from the hot exhaust is transferred through the sheet and absorbed by the cooler intake air increasing the efficiency of the gas turbine engine.

In most applications the primary surface sheet used in forming the cell is very thin, flimsy and difficult to maintain a uniform cross sectional area of the passages between the sheets. To enhance the rigidity of the thin sheets, the sheets are formed into an accordion type configuration forming peaks or crests and valleys forming a plurality of upwardly and downwardly opening, transversely extending, relatively deep grooves being relatively closely spaced and having substantially vertical side walls or fins. In forming the recuperator using such sheets, the peeks of alternate sheets are aligned and the valleys of alternate sheets are aligned to form the donor passages and the recipient passages. Additionally, many of the sheets are formed with a serpentined configuration to enhance a controlled turbulent which increases heat conductivity and resulting efficiency. In manufacturing such recuperators, the component parts are fixedly attached together by a welding process to prevent leakage from the respective donor passages and recipient passage. To insure the integrity of the recuperator, the welding process and technique used is very critical to maintaining a sealed separation between the plurality of donor passages and the plurality of recipient passages.

U.S. Pat. No. 5,060,721 issued on Oct. 29, 1991 to Charles T. Darragh discloses an example of one such recuperator. The recuperator disclosed in this patent has a circular configuration. The recuperator has a plurality of cells made from a pair of primary surface sheets, a plurality of spacer bars and a plurality of guide strips. The component parts are welded together to form the recuperator. The welding of these thin sheet and component parts into a cell having a sealed interface is difficult to accomplish in a cost effective and efficient manner.

After the assembly of the sheets and component parts into the cell and the assembly of the cells into the core, additional component, such as ducts, must be added to the core. The ducts direct the hot exhaust gas to and through the donor passages and direct the intake air to and thorough the recipient passages. These ducts are also welded to the core. The welding of these thin sheets of the core to the ducts and the relative positioning thereof with a sealed interface is difficult to accomplish in a cost effective and efficient manner.

The present invention is directed to overcome one or more of the problems as set forth above.

SUMMARY OF THE INVENTION

In one aspect of the invention, a recuperator assembly line is adapted to assemble a core. The core has a plurality of donor passages therein and a plurality of recipient passages. The recuperator assembly line has an assembly station including an upper stacking portion defining a first side and a second side. The upper stacking portion is rotatable between a first position and a second position. The core is positioned in the upper stacking portion. An assembly fixture is positioned at one of the first side and the second side. The assembly fixture has a plate having a bore therein. A plurality of locating members are positioned in one of the assembly fixture and the assembly station. The plurality of locating members define a preestablished relationship between the assembly fixture and the assembly station. A locating mechanism is positioned in the bore, the locating mechanism has a first end having a positioning portion located near said first end. A one of a plurality of ducting structures is attached to the positioning portion of the locating mechanism. The one of the plurality of ducting structures is positioned in a preestablished position relative to one of the plurality of donor passages and the plurality of recipient passages. A welding station has a welding head and forms a weld. A control station has a plurality of sensors, a plurality of switches and a controller operatively receiving an input from the plurality of sensors and the plurality of switches. The controller defines a relative position of the one of the plurality of ducting structures and the core. And, the one of the plurality of ducting structures is attached to the core with the weld.

In another aspect of the invention, a method of assembling a core into a recuperator has the steps of positioning the core in an upper stacking portion; securing the core within the upper stacking portion; positioning one of a plurality of ducting structures within an assembly fixture; positioning the assembly fixture relative to the upper stacking portion in a preestablished relationship; and welding the one of a plurality of ducting structures to the core.

In another aspect of the invention, a circular recuperator assembly line has an assembly station defining an axis and having a core defining an axis "A" being aligned about the axis of the assembly station and is removably positioned within the assembly station. An assembly fixture defines an axis and has a ducting structure removably positioned therein relative to the axis of the assembly fixture. The assembly fixture is position in axial alignment with the axis "A" of the core. A control station has a controller, a plurality of switches and a plurality of sensors defining an input to the controller of the relative position of the core within the assembly station and the ducting structure relative to the core. A welding station has a welding head and a lead. The welding station is operatively connected to the control station and the assembly station. And, a weld is interposed the core and the ducting structure.

DETAILED DESCRIPTION

Figure 1:
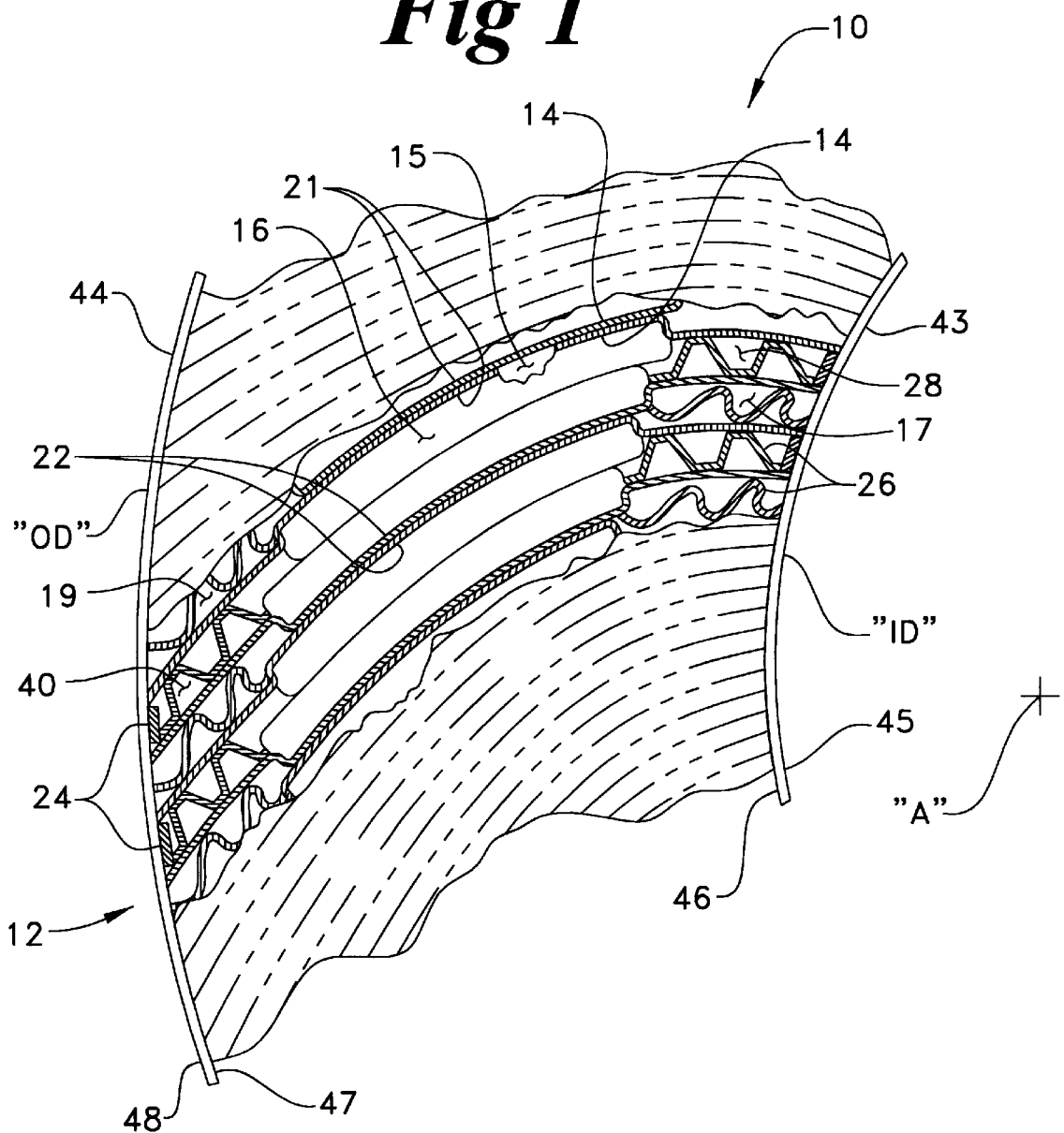
FIG. 1 is a sectional view of a partially assembled recuperator taken through a plurality of cells.

FIG. 1 shows a partially assembled recuperator 10. In the application shown, the recuperator 10 is that of a circular core 12. The core 12 is formed from a plurality of cells 14. The core 12 has a plurality of donor passages 15 formed therein and a plurality of recipient passages 16 formed therein. The core 12 has a plurality of donor inlet portions 17 positioned at a first side 18 of the core 12, best shown in FIG. 3. And, a plurality of donor outlet portions 19 are positioned at a second side 20 of the core 12, best shown in FIG. 3. The plurality of cells 14 are formed from a plurality of primary surface sheets 21 having a serpentined pleat 22 thereon, a plurality of spacer bars 24 and a plurality of guide vanes 26. The primary surface sheets 21 are very thin in thickness, for example, in this application the thickness is about 2.3 mm. However, as an alternative, the thickness can be larger or possibly thinner without changing the jest of the invention. Respective ones of the plurality of guide vanes 26 are positioned in a donor inlet end 28 of the respective plurality of donor passages 15 and positioned in a recipient inlet end 40 of the respective plurality of recipient passages 16. The respective plurality of primary surface sheets 21 and the respective plurality of spacer bars 24 of the respective plurality of cells 14 are fixedly attached by a welding station 42. The plurality of cells 14 are also fixedly attached by the welding station 42. The welding process and procedures used in each of the assembly of the plurality of sheets 21 and the plurality of spacer bars 24, and the plurality of cells 14 are very critical to maintain the integrity of the recuperator 10. After the plurality of cells 14 have been assembled, a plurality of recipient air ducting structures 43 and a plurality of donor gas ducting structures 44 are added to complete the recuperator 10. The plurality of donor gas ducting structures 44 and the plurality of recipient air ducting structures 43 are also fixedly connected by the welding station 42. In this application, with the core 12 being circular, the plurality of donor gas ducting structures 44 defines an axis, an inner surface 45 and an outer surface 46 thereon and the plurality of recipient air ducting structures 43 defines an axis, an inner surface 47 and an outer surface 48 thereon.

In this application, the circular core 12 has an inner diameter "ID" and an outer diameter "OD". The circular core 12 is centered about an axis "A". The inner diameter "ID" has a preestablished diameter and the outer diameter "OD" has a preestablished diameter.

Figure 2:
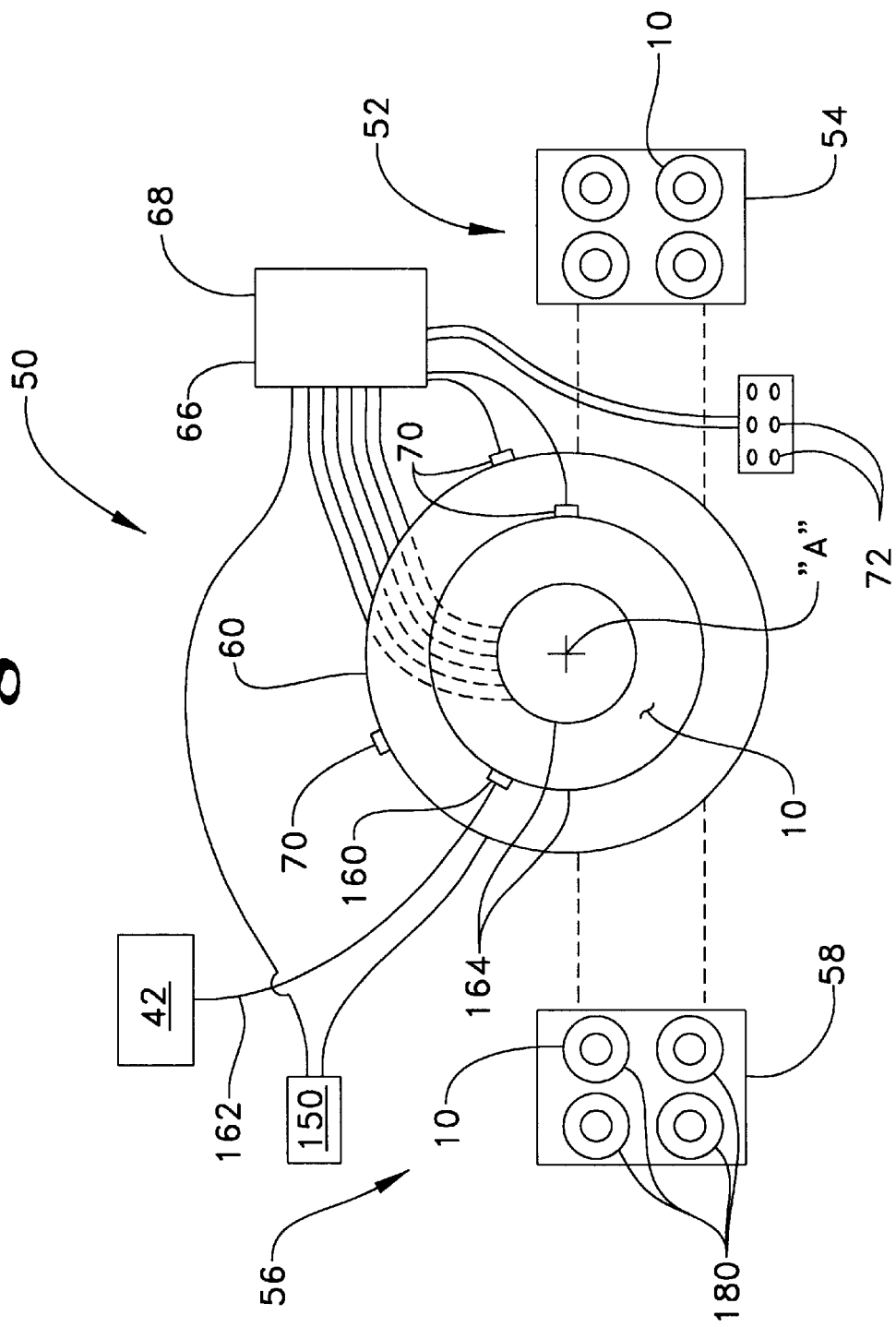
FIG. 2 is a schematically representation of a manufacturing system or line.

As shown in FIG. 2, a manufacturing or assembly line 50 is shown. The manufacturing or assembly line 50 has an inlet end 52 having a flat or tub 54 positioned at the inlet end 52 on which is positioned a plurality of partially assembled cores 12. For example, the partially assembled cores 12 have the respective plurality of cells 14, plurality of spacer bars 24, and the plurality of guide vanes 26 assembled one to another by the welding station 42. Positioned at an outlet end 56 being opposite the inlet end 52 is a flat or tub 58 on which is positioned assembled cells 12, or the recuperator 10, having the respective plurality of donor gas ducting structures 44 and the plurality of recipient air ducting structures 43 connected thereto by the welding station 42. Interposed the inlet end 52 and the outlet end 56 is an assembly station 60 being centered about an axis, which in operation coincides with the axis "A" of the core 12. The welding station 42 is operatively attached to the assembly station 60 and is positioned within the manufacturing or assembly line 50. A control station 66 is operatively attached to the assembly station 60 and the welding station 42. The control station 66 has a controller 68 which operatively receives inputs from a plurality of sensors 70 and a plurality of switches 72.

Figure 3:
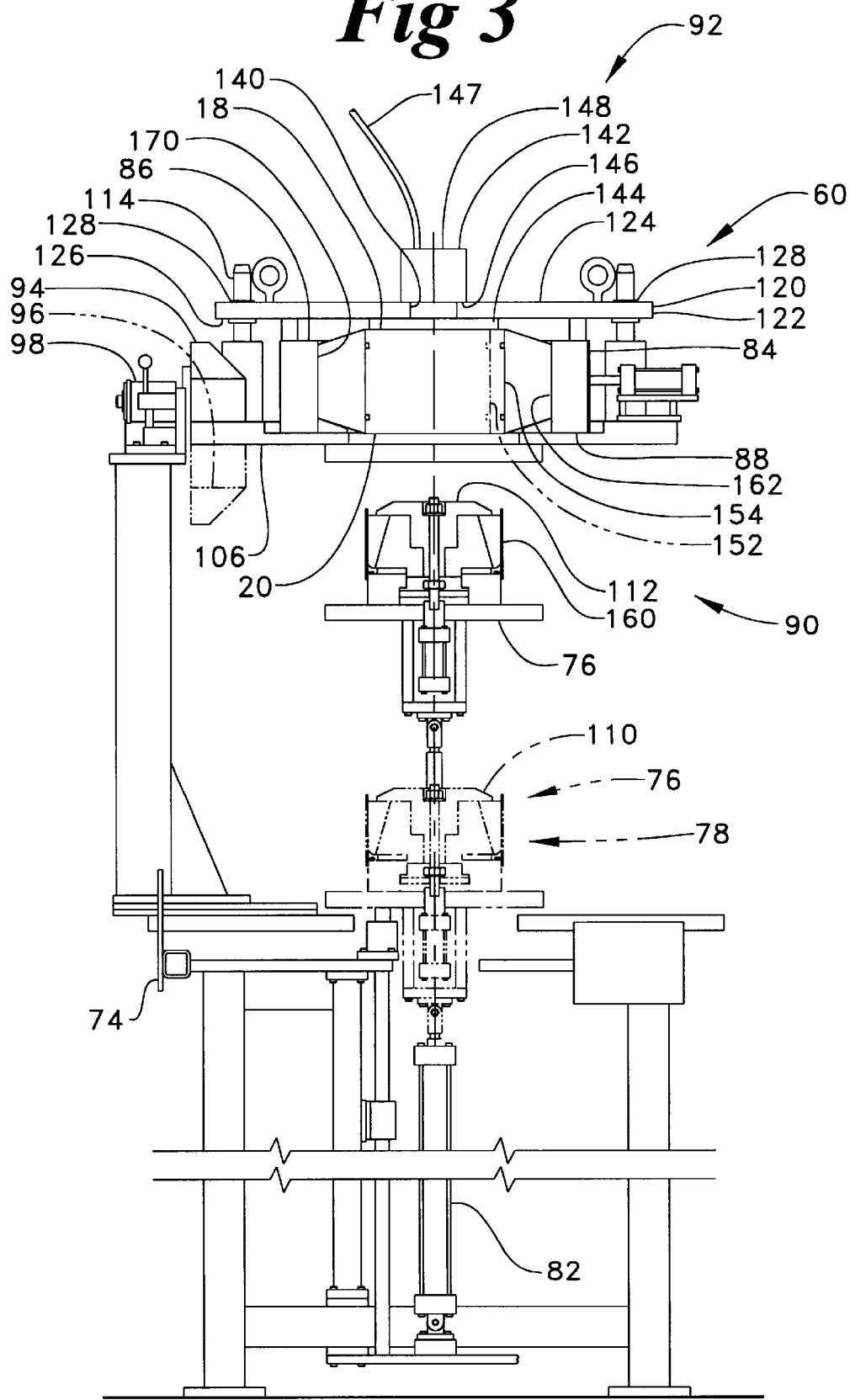
FIG. 3 is a detailed sectional view of a work station of the manufacturing line of FIG. 2.
Figure 4:
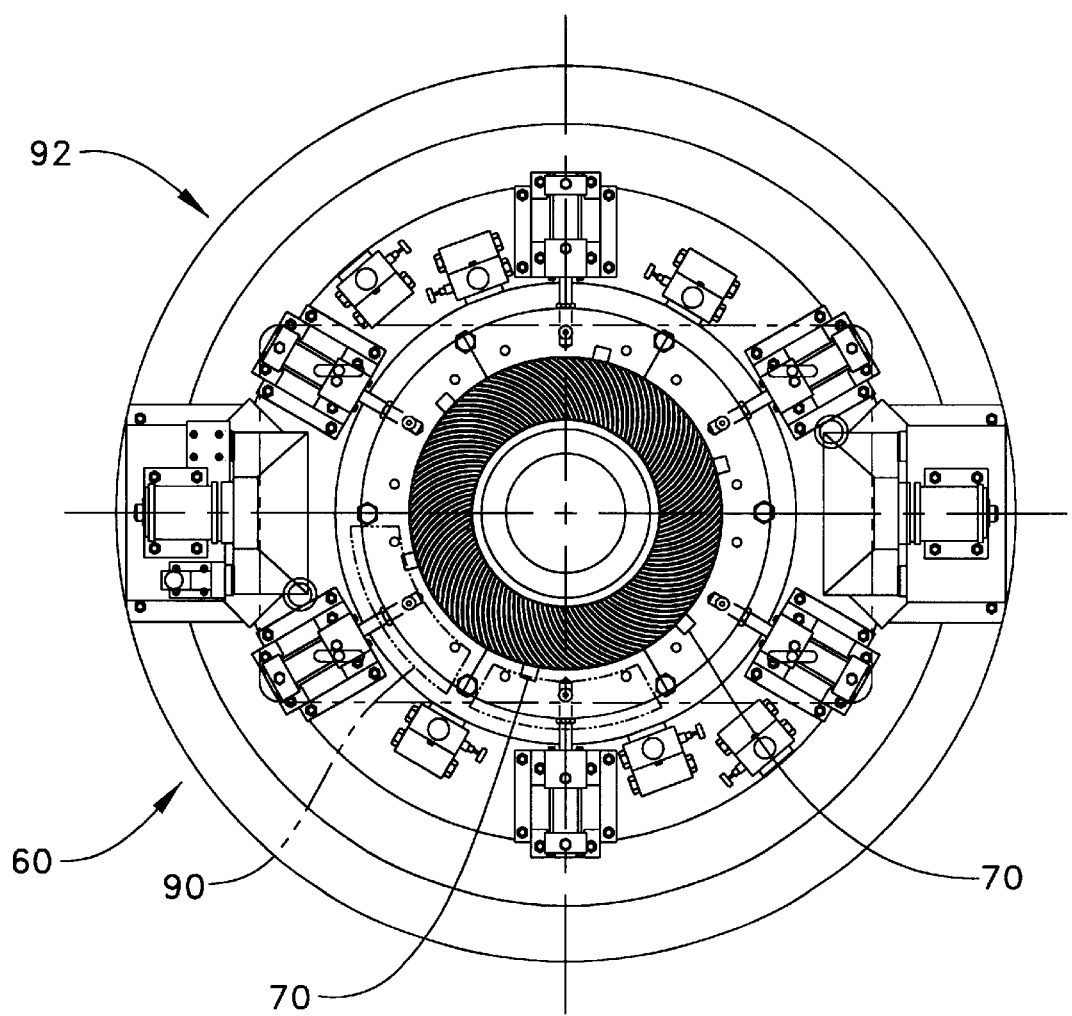
FIG. 4 is a top view of the work station of FIG. 3.

As best shown in FIGS. 3 and 4, the assembly station 60 includes a table 74 having an inner chucking portion 76 which is movable between a lower position 78, shown in phantom, and an upper position 80 by a cylinder 82. The cylinder 82 is hydraulically actuated but as an alternative could be electrically or pneumatically actuated. The table 74 also has an upper stacking portion 84 which defines a first side 86 and a second side 88. The upper stacking portion 84 is movable between a loading position 90, shown in phantom, and a clamping position 92. The upper stacking portion 84 is rotatable between a first position 94 and a second position 96 as is partially shown in phantom. The upper stacking portion 84 is rotatable 360 degrees and the first position 94 is indexed 180 degrees from the second position 96 by a motor 98 which in this application is hydraulically actuated. As an alternative, the motor could be electrically or pneumatically actuated. The upper stacking portion 84 is lockable at either of the first position 94 and the second position 96. The inner chucking portion 76 is expandable between a retracted position 110, shown in phantom, and an expanded position 112. Each of the first side 86 and the second side 88 of the upper stacking portion 84 have a plurality of locating members 114 such as dowels extending therefrom in a preestablished position. Each of the inner chucking portion 76 and the upper stacking portion 84 define an axis which with the core 12 positioned about the inner chucking portion 76 and the core 12 positioned within the upper chucking portion 84 aligns with the axis "A" of the core 12.

An assembly fixture 120 is orientated by the plurality of locating members 114. The assembly fixture 120 is adapted to be positioned on either of the first side 86 or the second side 88. The assembly fixture 120 includes a plate 122 defining a first side 124 and a second side 126. At least a pair of locating holes 128 which align with the plurality of locating members 114 extend between the first side 124 and the second side 126. As an alternative, the dowels could be positioned in the assembly fixture 120 the holes could be positioned in the inner chucking portion 76. A bore 140 is positioned in the plate 122 and extends between the first side 124 and the second side 126. The bore 140 defines an axis which with the locating holes 128 and the plurality of locating members 114 are aligned with the axis "A" of the core 12. A locator mechanism 142 is positioned in the bore 140. The locator mechanism 142 has a positioning portion 144 located near a first end 146. In this application, the locator mechanism 142 is hydraulically activated and has a hose 147 extending from a second end 148. The hose 146 is operatively attached to a source of fluid pressure 150. The source of fluid pressure 150 is operatively connected and controlled by the control station 66. The positioning portion 144 is expandable between a retracted position 152 and an expanded position 154.

The welding station 42 includes a welding head 160 having a lead 162 connected thereto. The welding head 160 and the lead 162 are of conventional construction. The welding head 160, in this application, has the ability of be manually controlled by an operator and to be automatically controlled. The welding head 160 produces a weld 164.

INDUSTRIAL APPLICABILITY

In operation, the recuperator assembly line 50 is used to manufacture the recuperator 10. The partially manufactured core 12 is available to the recuperator assembly line 50 at the input end 52. In this application, the operator removes the core 12 from the flat 54. Or, as an alternative, an automated process, such as a robot could perform the operator functions. With the inner chucking portion 76 in the upper position 80 and the upper stacking portion 84 in the loading position 90 the core 12 is positioned therein. The upper stacking portion 84 has the first side 86 up and the core 12 has the first side 18 up. The upper chucking portion 76 is moved into the clamping position 92 and the axis of the inner chucking portion 76, upper stacking portion 84 and the core 12 are aligned.

With the positioning portion 144 of the locating mechanism 142 in the retracted position 152, one of the donor gas ducting structures 44 is positioned about the positioning portion 144. The source of pressure 150 is actuated and the positioning portion 14 is moved into the expanded position 154.

With the positioning portion 144 of the locating mechanism 142 in the retracted position 152, one of the recipient air ducting structures 43 is positioned about the positioning portion 144. The source of pressure 150 is actuated and the positioning portion 14 is moved into the expanded position 154. The positioning portion 144 is positioned above the upper stacking portion 84, the pair of locating holes 128 are aligned with the plurality of locating members 114 and lowered until the recipient air ducting structure 43 is in contact with the first side 18 of the core 12. By using the locating holes 128 and the locating members 114 the axis of the recipient air ducting structure 43 and the axis "A" of the core 12 are aligned.

The plurality of sensors 70 monitor the position of the respective parts and when aligned or mated sends a signal to the controller 68 of the control station 66. The controller 68 signals the operator that a weld 164 of the welding station 42 can be welded. The welding head 160 is positioned relative to the recipient air ducting structure 43 and the core 12 and a plurality of tack welds 164 are initiated. For example, about six locations are used to secure the recipient air ducting structure 43 to the core 12. With the tack welds 164 completed, the interface of the recipient air ducting structure 43 and the core 12 at the outer surface 46 and the inner diameter "ID" respectively are completely welded 164. With the tack welds 164 complete, the locating member 114 can be removed to provide additional room for easier welding 164. With the first side 18 of the core 12 up any additional ducting structure 43, 44 can be welded 164 thereto in a similar manner. During the welding process, caution must be taken to prevent burning through of the thin sheets 21 of which the core 12 is made which would result in a defective core 12. It should be noted that the welding operation can be done manually or with an automated process.

With the welds 164 complete on the first side 18 of the core 12, the upper stacking portion 84 is indexed or rotated from the first position 94 into the second position 96 and locked into the second position 96. Thus, any remainder of the welding can be welded 164 to the second side 20 of the core 12 in a similar manner and process.

With the welding of the ducting structures 43, 44 to the core 12 complete, the upper stacking portion 84 is moved into the loading position 90 and the core 12 and ducting structures 43, 44 are removed from the upper stacking portion 84. With the core 12 and the ducting structures 43, 44 clamped in the upper stacking portion 84, if desired, a shipping band or bands can be added to the structure to maintain the outer diameter "OD" within it diameter. Such a band can also be added to the core 12 prior to rotating the upper stacking portion 84 from the first position 94 to the second position 96, if desired.

Thus, an effective and efficient assembly of the core 12 and the ducting structures 43, 44 is accomplished. The ducting structures 43, 44 are properly aligned with the core 12. And, the relationship of the ducting structures 43, 44 to there defined relationship with the completed recuperator 10 is maintained for further use and assembly of the recuperator's 10 future application. With the relationship of the ducting structures 43, 44 and the core 12 maintained the welding of the interface is made easier, more efficient and effective. And, results in a high quality, lower maintenance, more efficient recuperator 10.

What is claimed is:

1. A recuperator assembly line for assembling a core, said core having a plurality of donor passages therein and a plurality of recipient passages therein; comprising:

an inlet end having said core positioned thereat;

an assemble station including an upper stacking portion defining a first side and a second side, said upper stacking portion being rotatable between a first position and a second position, and said core being positioned in said upper stacking portion;

an assembly fixture being positioned at one of said first side and said second side, said assembly fixture including a plate having a bore therein;

a plurality of locating members being positioned in one of said assembly fixture and said assembly station, said plurality of locating members defining a preestablished relationship between said assembly fixture and said assembly station;

a locating mechanism being positioned in said bore, said locating mechanism having a first end having a positioning portion located near said first end;

a one of a plurality of ducting structures being attached to said positioning portion of said locating mechanism, said one of said plurality of ducting structures being positioned in a preestablished position relative to one of said plurality of donor passages and said plurality of recipient passages;

a welding station having a welding head and forming a weld;

a control station having a plurality of sensors, a plurality of switches and a controller operatively receiving an input from said plurality of sensors and said plurality of switches, said controller defining a relative position of said one of said plurality of ducting structures and said core and said one of said plurality of ducting structures being attached to said core with said weld; and an out put end having said core and one of a plurality of ducting structures welded together being positioned thereat.

2. The recuperator assembly line of claim 1 wherein said core has a circular configuration defining an inner diameter "ID" and said preestablished position of said one of said plurality of ducting structures relative to one of said plurality of donor passages and said plurality of recipient passages being at said inner diameter "ID".

3. The recuperator assembly line of claim 1 wherein said core has a circular configuration defining an outer diameter "OD" and said preestablished position of said one of said plurality of ducting structures relative to one of said plurality of donor passages and said plurality of recipient passages being at said outside diameter "OD".

4. The recuperator assembly line of claim 1 wherein said core has a circular configuration defining an inner diameter "ID" and said preestablished position of said one of said plurality of ducting structures relative to one of said plurality of donor passages and said plurality of recipient passages being at said inside diameter "ID".

5. The recuperator assembly line of claim 1 wherein said core has a circular configuration defining an axis "A" and said upper stacking portion has an axis, each of said axis coinciding with each other.

6. The recuperator assembly line of claim 1 wherein said upper stacking portion being at said first position has said first side up and said core has a circular configuration defining an inner diameter "ID" and said preestablished position of said one of said plurality of ducting structures relative to one of said plurality of donor passages and said plurality of recipient passages being at said inside diameter "ID" at said first side, and said upper stacking portion being at said second position has said second side up and said preestablished position of said one of said plurality of ducting structures relative to one of said plurality of donor passages and said plurality of recipient passages being at said inside diameter "ID" at said second side.

7. The recuperator assembly line of claim 1 wherein said upper stacking portion being at said first position has said first side up and said core has a circular configuration defining an outer diameter "OD" and said preestablished position of said one of said plurality of ducting structures relative to one of said plurality of donor passages and said plurality of recipient passages being at said first side, and said upper stacking portion being at said second position has said second side up and said preestablished position of said one of said plurality of ducting structures relative to one of said plurality of donor passages and said plurality of recipient passages being at said outside diameter "OD" at said second side.

8. A circular recuperator assembly line comprising:
   an inlet end;
   an assembly station defining an axis and having a core defining an axis "A" being aligned about the axis of said assembly station and being removably positioned within said assembly station;
   an assembly fixture defining an axis and having a ducting structure removably positioned therein relative to said axis of said assembly fixture, and said assembly fixture being position in axial alignment with said axis "A" of said core;
   a control station having a controller, a plurality of switches and a plurality of sensors defining an input to said controller of the relative position of said core within said assembly station and said ducting structure relative to said core; and
   a welding station having a welding head and a lead, said welding station being operatively connected to said control station and said assembly station.

9. The circular recuperator assembly line of claim 8 wherein said assembly station having a upper stacking portion being rotatable between a first position having a first side of said core being up and a second position having a second side of said core being up.

10. The circular recuperator assembly line of claim 9 wherein said upper stacking portion is lockable as said first position and said second position.

11. The circular recuperator assembly line of claim 8 wherein said core has a circular configuration defining an inner diameter "ID" and said ducting structure being positioned at said inner diameter "ID".

12. The circular recuperator assembly line of claim 8 wherein said core has a circular configuration defining an outer diameter "OD" and said ducting structures being positioned at said outside diameter "OD".

13. The circular recuperator assembly line of claim 8 wherein said core has a circular configuration defining an inner diameter "ID" and an outer diameter "OD" and said ducting structure being positioned at each of said inside diameter "ID" and said outside diameter "OD".

14. The circular recuperator assembly line of claim 8 wherein said upper stacking portion being at said first position and has said first side of the core up and said core has said circular configuration defining an inner diameter "ID" and said ducting structure being at said inside diameter "ID" at said first side, and said upper stacking portion being at said second position has said second side of the core up and said ducting structure being at said inside diameter "ID" at said second side.

\* \* \* \* \*